United States Patent Office 3,178,740
Patented Apr. 20, 1965

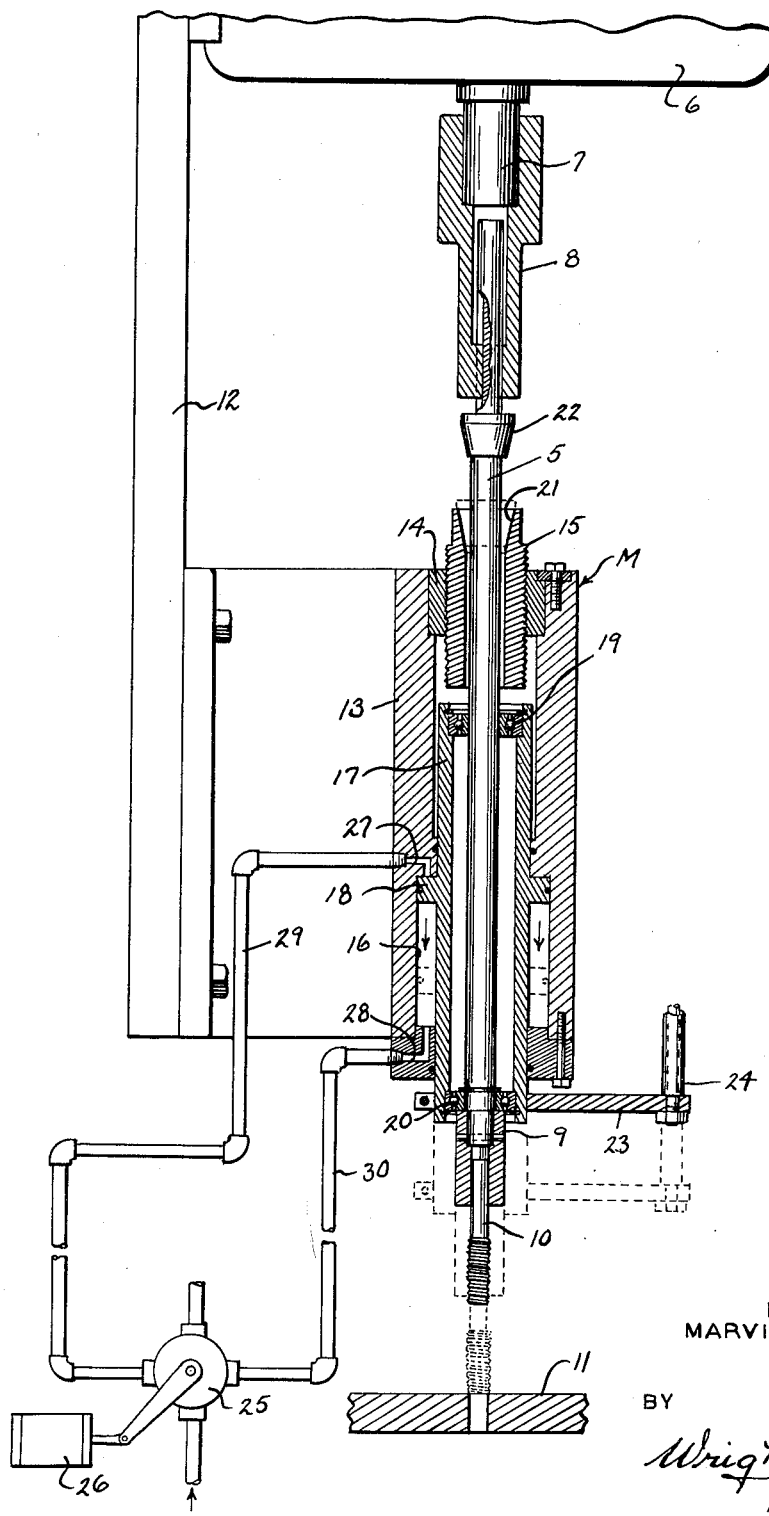

3,178,740
LEAD SCREW FEED MEANS WITH MEANS TO
CLUTCH ROTATING SPINDLE TO FEED MEANS
Marvin H. Dorak, Manitowoc, Wis., assignor to Kaufman
Mfg. Co., Manitowoc, Wis., a corporation
Filed Aug. 30, 1961, Ser. No. 135,020
5 Claims. (Cl. 10—139)

This invention appertains to metal working machines of the type in which a rotating tool is moved back and forth toward and away from the work, and more particularly to a tapping or screw threading machine.

Tapping machines in general use include a spindle carrying the tapping tool. The spindle is rotated by various means and is fed into and out of the work through the use of a commonly used lead screw and nut, by gearing the spindle in direct relation to the speed of its rotation and in some cases by the use of fluid means. This invention contemplates the use of a lead screw in a novel manner to provide greater accuracy and control than the previous means mentioned. The threads on the lead screw when mounted directly on the spindle are of the same pitch as threads on the tapping tool. The spindle is connected to the lead screw through the medium of a key and keyway or spline, and consequently, the lead screw and spindle rotate in unison at all times. The reversing of the direction of rotation of the spindle is accomplished by the use of a reversible motor and limit switches or clutches for proper control to affect the forward and reverse stroke of the spindle.

With these types of tapping machines inertia is built up in the motor, the train of gearing, if present, and the like, and consequently, the lead screw continues to rotate with the spindle a considerable length of time after the stopping of the motor and motive power. To avoid this, the motor is sometimes provided with a brake or plugging switch causing heat, which necessitates the cooling thereof and other accessories. Continued rotation of the lead screw and spindle is detrimental to the operation of the machine and breakage of parts often occurs.

One of the primary objects of this invention is to eliminate the braking of the motor by the means commonly used and allow it to rotate continuously and to provide a simple and novel means for automatically disconnecting the drive between the spindle and the lead screw when the tapping tool leaves the work and to automatically reconnect the spindle with the lead screw as the tool reaches the work.

Another salient object of the invention is the provision of mechanism for operatively connecting the rotating spindle with the lead screw when the tap reaches the work for properly feeding the tap into the work and for quickly disconnecting the spindle from the lead screw when the tap is out of the work, whereby rotation of the lead screw will immediately cease and thereby eliminate damage to the lead screw and feed nut.

A further important object of the invention is the provision of means for automatically and quickly bringing the tool toward the work and then automatically connecting the tool (spindle) with the lead screw for feeding the tool into the work and for automatically disconnecting the spindle and tool from the lead screw when the tool is out of the work and for quickly sliding the spindle and tool away from the work to its complete reverse stroke for facilitating the removal of the completed work and the replacing of a new piece of work in position.

A still further object of the invention in one embodiment thereof is to provide a clutch member operatively connected with the spindle and a mating cooperating clutch member on the lead screw, whereby upon movement of the spindle back and forth, the clutch members can be brought into and out of clutching relation for controlling the rotation of the lead screw.

A still further important object of the invention is to provide an automatic means including one or more cylinders and pistons, or other means for reciprocating the spindle to bring the clutch members into and out of engagement.

With these and other objects in view, the invention consists in the novel construction, arrangement and formation of parts, as will be hereinafter more specifically described and claimed, and illustrated in the accompanying drawing, in which drawing, The figure is a diagrammatic view showing the principles of the invention applied to one type of metal working machine, the view being in longitudinal section.

Referring to the drawing in detail, the letter M generally indicates a metal working machine embodying one form of the invention. For the purpose of illustration, the machine M can be considered as a tapping or screw threading machine and the same embodies a rotating spindle 5 operatively connected to a reversible electric motor 6. The spindle 5 can be connected to the motor 6 by a train of gearing or the like and such train can embody speed changing gears, if so desired. For the sake of simplicity, I have shown the spindle 5 connected directly with the armature shaft 7 of the motor by a coupling sleeve 8. The spindle 5 slides back and forth within the coupling sleeve and the sleeve can be operatively connected to the spindle by means of a key and keyway or spline. The forward end of the spindle is provided with a chuck or socket 9 for releasably gripping a tool 10. This tool can be, as shown, a tap for forming threads in a piece of work 11. The piece of work 11 is detachably and properly held on the machine in any approved manner.

The machine M also includes a frame 12 for supporting the motor 6 and a guide head 13. The machine has been illustrated as being disposed in a vertical plane, but it is to be understood that the machine can be located in a horizontal plane or any other position.

To illustrate one form of the invention, a frame head 13 has been shown provided with a removable feed nut 14 having formed therein threads of a desired pitch for receiving a lead screw 15 having mating threads. The feed nut and lead screw have their threads pitched to conform to the pitch of the threads of the tap whereby the tap will be fed into and out of the work at a desired and preferred rate. The frame head 13 is bored to provide a cylinder 16 and reciprocally mounted within the cylinder is a piston sleeve 17 carrying a piston head 18 operatively mounted within the cylinder. The cylinder sleeve at its opposite ends carries bearings 19 and 20 for rotatably carrying the spindle and at least one of the bearings is of the thrust type, so that the spindle will be moved with the cylinder sleeve upon reciprocation thereof.

In the simple form of the invention illustrated, the outer end of the lead screw 15 is provided with a tapered clutch face or seat 21 and keyed or otherwise secured to the spindle is a cone clutch 22 for movement into and out of mating engagement with the clutch face or seat 21.

It can be seen that when the cone clutch 22 mates with the face 21, that the lead screw will be rotated with the spindle and the lead screw will then feed the tap into and out of the work and when the cone clutch 22 is disengaged from the clutch face 21 the spindle will cease to impart rotary movement to the lead screw.

The distance of travel back and forth of the spindle is controlled by limit switches and these switches bring about the reversing of the motor. As the limit switches and circuits thereof are common, the same have not been illustrated, but it is to be noted that the cylinder sleeve 17 carries an arm 23 to which is secured a rod 24 carrying means for operating the limit switches.

The invention seeks to move the spindle and its tap rapidly toward the work until the clutch is engaged and thereafter the lead screw takes over the feeding of the tap into the work. Likewise, upon the reversing of the motor 6 and when the tap is fed out of the work, the means is then provided for rapidly moving the spindle to its complete reversed position of travel. This is accomplished by the use of the cylinder 16 and piston sleeve 17.

To properly operate the piston within the cylinder sleeve, I provide a preferred type of four-way valve 25 and the valve is actuated by a solenoid 26. The plunger of the solenoid can be spring pressed in one direction. The opposite ends of the cylinder 16 are provided with ports 27 and 28, and these ports are connected to the four-way valve 25 by pipe lines 29 and 30. In one position of the valve, fluid is fed into the cylinder through the port 28 and the piston moves upwardly and fluid is allowed to escape through the pipe 29 and out of the valve. In the other position of the valve, fluid flows into the cylinder through the port 27 and the fluid on the other side of the piston is exhausted through port 28.

Current flow to the solenoid is also controlled by limit switches properly positioned relative to the rod 24.

In operation, and considering that the ports are in the position shown in full lines in the drawing, then the valve 25 will be actuated to force fluid into the cylinder 16 from port 27 and to exhaust fluid through port 28 and the spindle with its tool 10, will be rapidly moved toward the work until the cone clutch 22 mates with the clutch face 21, as shown in dotted lines. At this time the lead screw will be rotated and the tool 10 will be fed into the work. Upon completion of the proper stroke, the motor will be reversed by a limit switch, and the tap will be threaded out of the work. When the tap is free of the work the valve is de-energized and the cone clutch 22 is disengaged from the clutch face 21 and at this time the position of the valve 25 will be reversed by the solenoid and fluid will flow into the cylinder through port 28 and fluid on the other side of the piston 28 will flow out of the port 27 and the spindle and its tap will be rapidly moved to a complete raised position. At this time, the direction of rotation of the motor 6 will again be reversed and the cycle of operation will be repeated.

It is to be understood that only one simple form of the invention has been illustrated, and that this showing is by way of example only, and that the invention can be used on different types of machines, and can take different forms for such different types.

Thus, in the drawing I have shown the machine with the spindle and tool being fed toward and away from the work but it is to be understood that the work can be fed toward and away from the spindle and its tool.

Changes in details may be made without departing from the spirit or the scope of this invention, but what is claimed as new is:

1. In a metal working machine, a spindle, a reversible electric motor, means for rotating the spindle from the motor, a tool carried by the spindle, means for reciprocating the spindle back and forth to bring the tool toward and away from the work, a normally fixed feed nut, a lead screw carried by the feed nut, and said spindle rotatably extending through the lead screw, and means for operatively connecting the spindle with the lead screw for rotating the lead screw and for feeding the tool into the work when the tool reaches the work and for continuing the tool to the proper depth, and then reversing the tool out of the work to a point where the tool has left the work and for then disconnecting the spindle from the lead screw for returning the tool and spindle to their original positions including a clutch face formed on the lead screw and a clutch member rigidly carried by the spindle movable with the spindle into and out of clutching engagement with said face.

2. In a metal working machine including at least one spindle, a tool carried by said spindle, reversible means for rotating the spindle, means for reciprocating the spindle, means for feeding the tool into and out of the work including a feed nut, a lead screw fitted into the nut, the nut and lead screw having threads of a selected pitch, a clutch member carried directly by the spindle, and a cooperating clutch member operatively connected to the lead screw for causing rotation of the lead screw when the clutch members are interengaged.

3. In a metal working machine including at least one rotatable spindle carrying a tool, for operation upon a piece of work with one being movable in a linear path relative to the other for positioning the tool into operative and inoperative relation to the work, reversible means for rotating the spindle, means for feeding the tool into and out of the work including a feed nut, a lead screw fitted into the nut, the lead screw and nut having mating threads of a selected pitch, a clutch member carried directly by the spindle, and a cooperating clutch member operatively connected to the lead screw for causing rotation of the lead screw when the clutch members are interengaged.

4. In a metal working machine including at least one rotatable spindle carrying a tool, for operation upon a piece of work with one being movable in a linear path relative to the other for positioning the tool in operative relation to the work, means for rotating the spindle, means for feeding the tool into the work including a feed nut and a lead screw fitted into the nut, the lead screw and nut having mating threads of a selected pitch, a clutch member carried directly by the spindle, and a cooperating clutch member operatively connected to the lead screw for causing rotation of the lead screw when the clutch members are interengaged.

5. In a metal working machine, a rotating spindle, a reversible electric motor, means operatively connecting the spindle to the motor to bring about the rotation of the spindle, a tool operatively connected to the spindle for rotation therewith, means for reciprocating the spindle back and forth for bringing the tool toward and away from the work, a normally fixed feed nut, a normally inactive lead screw threaded into the feed nut for advancing the tool into and out of the work according to the direction of rotation of the spindle, means operatively connecting the spindle to the lead screw for rotating the lead screw when the tool reaches the work and for disconnecting the spindle from the lead screw when the tool is withdrawn from the work, and said means for operatively connecting the spindle to the lead screw including a clutch member carried by the spindle and a clutch face on the lead screw.

References Cited by the Examiner
UNITED STATES PATENTS

| 2,370,859 | 3/45 | Hale | 192—85 |
| 3,013,285 | 12/61 | Arengo | 10—139 |

ANDREW R. JUHASZ, *Primary Examiner.*
WILLIAM W. DYER, JR., *Examiner.*